United States Patent [19]

Kunisaki et al.

[11] Patent Number: 4,860,425
[45] Date of Patent: Aug. 29, 1989

[54] COMPOSITE MEMBER MANUFACTURING METHOD

[75] Inventors: Toshiharu Kunisaki; Masamori Higuchi, both of Kanagawa, Japan

[73] Assignee: Fuji Xerox Co., Ltd., Tokyo, Japan

[21] Appl. No.: 230,548

[22] Filed: Aug. 10, 1988

[30] Foreign Application Priority Data

Aug. 27, 1987 [JP] Japan ............................ 62-211322

[51] Int. Cl.⁴ .............................................. B23P 17/00
[52] U.S. Cl. .................................. 29/527.4; 29/527.1; 29/530; 264/259; 264/261
[58] Field of Search ............... 29/527.1, 530; 264/249, 264/259, 261; 425/123, 810

[56] References Cited

U.S. PATENT DOCUMENTS

| | | | |
|---|---|---|---|
| 3,689,210 | 9/1972 | Stein ...................................... | 425/123 |
| 4,445,952 | 5/1984 | Reynolds, III et al. ........ | 174/68.5 X |
| 4,470,786 | 9/1984 | Sano et al. ........................ | 425/123 X |

FOREIGN PATENT DOCUMENTS 224514  11/1985  Japan ................................. 425/123

OTHER PUBLICATIONS

U.S. Patent Application Ser. No. 07/098,795, filed Sep. 21, 1987.

Primary Examiner—Howard N. Goldberg
Assistant Examiner—Carl J. Arbes
Attorney, Agent, or Firm—Finnegan, Henderson, Farabow, Garrett, & Dunner

[57] ABSTRACT

Metal plates having respective adhesive layers are put one on one with their adhesive layers inside, and pressed and punched by a metal mold assembly. After the upper plate is separated by a predetermined distance from the lower plate, molten synthetic resin is poured into a cavity between the two metal plates by injection molding, thereby forming a composite member of the metal plates and the synthetic resin. A projected portion which is connected to the synthetic resin layer can be formed through a hole made by punching work.

6 Claims, 3 Drawing Sheets

COMPOSITE MEMBER MANUFACTURING METHOD

BACKGROUND OF THE INVENTION

The present invention relates to a method of manufacturing a composite member of metal plates and synthetic resin, and particularly relates to a method of manufacturing a composite member of metal plates and synthetic resin in which the composite member of metal plates and synthetic resin can be easily manufactured, and bending and/or drawing work can be simultaneously performed if necessary.

Conventionally, known are various kinds of method of producing a composite member made of metal plates and synthetic resin layers. For example, in order to produce a composite member having a sandwich structure with a pair of metal plates, there is a typical method in which metal plates are bonded through an adhesive onto opposite surfaces of a synthetic resin plate which is formed platelike through extrusion molding.

However, in the case of producing a composite member having the sandwich structure by such a known method, there has been a problem that the composite member which can be produced is limited to a plate-like one, and any composite member having a solid structure including a bent portion, a drawn portion, or the like, can not be produced. In the case of producing a composite member having a predetermined shape, on the other hand, there has been a problem that at least three steps of preparing metal plates by punching, preparing a synthetic resin plate by molding, and bonding the metal plates onto the synthetic resin plate through an adhesive are required, thereby making the work complicated.

In order to solve the above problems, a method of producing a composite member having a three-layer structure has been proposed, which method comprises the steps of feeding at least two previously rust-prevention-treated metal plates into a metal mold assembly, performing punching and cutting work on the metal plates by using a punch and a die constituting a cavity and a core in the metal mold assembly, slightly opening the metal mold assembly with attracting the two metal plates toward a movable side and a fixed side metal mold, respectively, by means of vacuum or magnetic attraction to thereby form a gap between the metal plates, and pouring adhesive resin into the gap by means of injection molding (U.S. patent application Ser. No. 07/098,795).

In this method, however, there has been a problem that it is necessary to raise the temperature of the metal mold assembly up to 70°-90° C. in order to cause the adhesive resin to tightly adhere to the metal plates, so that the metal mold assembly expands to thereby make it impossible to secure a clearance necessary to perform press working and the press working becomes difficult.

SUMMARY OF THE INVENTION

It is therefore an object of the present invention to solve all the problems described above.

It is another object of the invention to provide a method of easily producing a strong composite member made of metal plates and a synthetic resin plate.

It is a further object of the invention to provide a method of producing a composite member in which working such as punching, bending, drawing, etc. can be simultaneously performed.

It is a further object of the invention to provide a method of producing a composite member in which raising the temperature of a metal mold assembly is not necessary.

According to the present invention, a method of producing a composite member of metal plates and synthetic resin comprises the steps of: putting a stack of two metal plates between the first and second metal molds, each of the two metal plates having an adhesive layer and the two metal plates being put one on one with their respective adhesive layers inside so as to be in opposition to each other, the first metal mold having at least one of movable and fixed piercing punches, and the second metal mold having at least one of movable and fixed piercing dies which correspond to the respective punches; performing press working on the metal plates put between the first and second metal molds; separating at least one of the first and second metal molds from the other by a predetermined distance in the state where the first and second metal molds hold the respective metal plates opposed to each other, so as to form a cavity of a predetermined width between the two metal plates; injecting molten synthetic resin into the cavity formed between the metal plates so as to form a synthetic resin layer; hardening the resin layer; and taking out a molded member from the metal mold assembly.

DETAILED DESCRIPTION OF THE PREFERRED EMBODIMENTS

Figure 1:
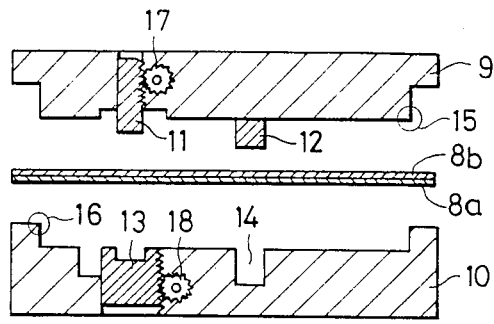
FIGS. 1 through 5 are views showing steps of an embodiment of a composite member producing method according to the present invention.

Referring to the drawings, the present invention will be described hereunder in detail. FIGS. 1 through 5 are views showing steps of an embodiment of a method of producing a composite member of plates and synthetic resin according to the present invention.

FIG. 1 shows a state in which a metal mold assembly is opened before working. In the drawing, the metal mold assembly is constituted by a movable metal mold 9 and a fixed metal mold 10. A pair of rust-prevention-treated metal plates 8a and 8b having adhesive layers on their respective surfaces are put one on the other and disposed between the movable and fixed metal molds 9 and 10. The movable metal mold 9 is provided with movable and fixed piercing punches 11 and 12, respectively, for press working, and a punch cutting-edge portion 15 for outer-circumferential working. The fixed metal mold 10 is provided with movable and fixed piercing die holes 13 and 14, respectively, for press working, and a die cutting-edge portion 16 for outer-circumferential working. The movable and fixed metal molds 9 and 10 are provided with gears 17 and 18 for moving the movable piercing punch 11 and the movable piercing die 13, respectively. As shown in the drawing, the piercing punch 11 is stopped at its position where it is projected downward by the piercing punch moving gear 17, a cylinder, or the like, while the movable piercing die 13 opposed to the piercing punch 11 is projected upward by the piercing die moving gear 18, a cylinder, or the like.

Figure 2:
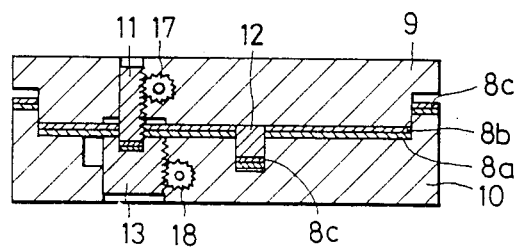

Next, as shown in FIG. 2, the movable metal mold 9 is lowered onto the fixed metal mold 10 so that the movable metal mold 9 is pressed against the fixed metal mold 10. Thus, press working is performed so that the stacked plates 8a and 8b are bored by means of the piercing punches 11 and 12. Further, the outer circumferences of the plates 8a and 8b are cut at the same time and chips 8c are produced.

Figure 3:
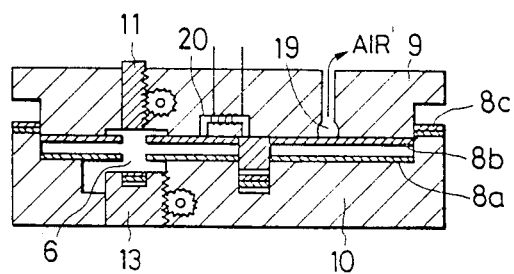

Next, as shown in FIG. 3, the movable metal mold 9 is moved upward by a predetermined distance so that the plates 8a and 8b are separated from each other with a predetermined interval. At this time, the movable metal mold 9 may be provided with a through hole 19 so that air is sucked through the hole 19 to attract the plate 8b to the movable metal mold 9, or may be provided with an electromagnet 20 in a bottom surface at a central portion of the movable metal mold 9 so that when energized the electromagnet 20 attracts the plate 8b to the bottom surface of the movable metal mold 9. Then, the piercing punch 11 and the piercing die 13 are moved upward and downward by the gears 17 and 18, respectively, by using cylinders or by using any other means so as to form a cavity into which synthetic resin is to be made to flow.

Figure 4:
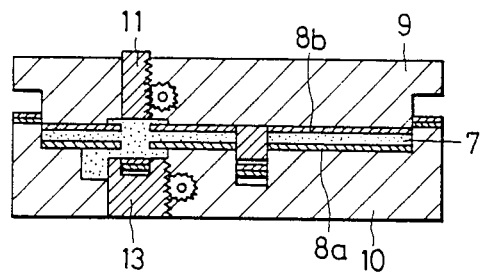

When the plates 8b and 8a have been separated from each other by the predetermined interval, synthetic resin 7 in a molten state is poured into the interval by means of injection molding. Accordingly, as shown in FIG. 4, the gap between the plates 8a and 8b and the holes of the metal plates 8a and 8b which were formed by the piercing punch 11 are filled with the synthetic resin 7; and portions outside the metal plates 8a and 8b opposite to the respective holes are also filled with the resin 7 through the holes of the metal plates 8a and 8b. On the other hand, the holes formed by the piercing punch 12 are prevented from being filled with the synthetic resin 7 by the existence of the piercing punch 12 so that the holes are maintained empty. Thus, projecting portions of the synthetic resin are simultaneously formed at the outsides of the metal plates.

Figure 5:
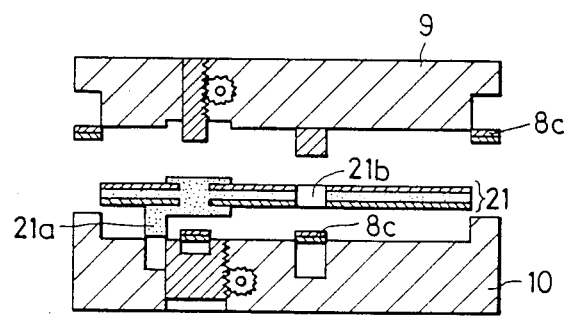

After the synthetic resin 7 has been solidified, the movable metal mold 9 is further moved so as to open the metal mold assembly as shown in FIG. 5. Then, a composite member 21 of the plates and the synthetic resin is taken out of the metal mold assembly.

In the embodiment, also the fixed die 10 may be arranged to be movable.

The composite member 21 produced as described above has a structure with five layers of a metal plate, an adhesive layer, a synthetic resin layer, an adhesive layer, and a metal plate. Further, in the case of the embodiment, the composite member 21 has a projecting portion 21a formed on the outside of the plate so as to be connected with the synthetic resin inside the plates, and has a through hole 21b penetrating the composite member 21.

Figure 9:
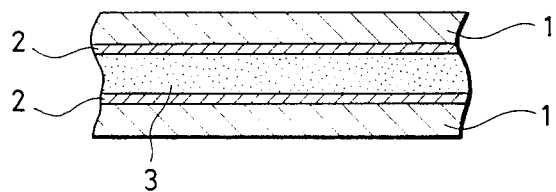
FIGS. 9 and 10 are sectional views showing parts of composite members produced according to the present invention.
Figure 10:
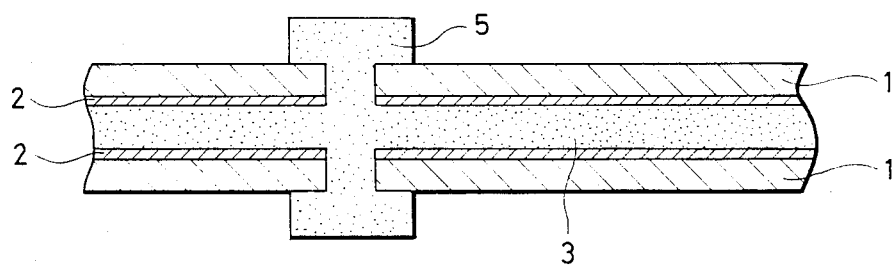

FIGS. 9 and 10 are views showing in section parts of the composite member produced according to the present invention. The composite member has a structure with five layers of a metal plate 1, an adhesive layer 2, a synthetic resin layer 3, an adhesive layer 2, and a metal plate 1. In FIG. 10, a rivet-like portion 5 is formed.

According to the present invention, various kinds of metal plates can be used. It is however preferable to use metal plates having surfaces previously coated with black paint, for example, PERCOAT (produced by Nippon Steel Corporation), because the following painting step can be omitted. The adhesive layer is formed by use of an adhesive film or an adhesive. Although some kinds of adhesive film may be used, it is preferable to use, for example, a film made of polypropylene or nylon. As the adhesive, it is preferable to use a polyurethane adhesive or a chloroprene adhesive. The adhesive layer may be formed on a metal plate in such a manner that an adhesive film is put on the metal plate which has been subjected to rust-prevention treatment and suitable pressure and temperature are applied in pressing so as to laminate the adhesive film on the metal plate, or the metal plate is coated with an adhesive by an ordinary method. Although any kind of synthetic resin may be used to form the resin layer between the metal plates as long as it can be suitably used for injection molding, polypropylene is preferably used in view of adhesion with the adhesive layer as well as a heat-resisting property.

Figure 6:
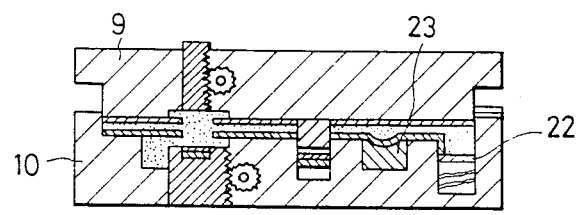
FIG. 6 is a view showing a main step of another embodiment of the invention.
Figure 7:
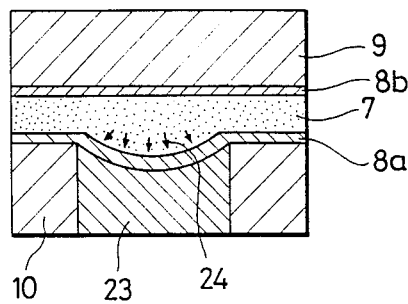
FIG. 7 is an enlarged sectional view showing a drawing-working portion.

A second embodiment of the present invention will be described hereunder. FIG. 6 is a view showing a main step of this embodiment, and FIG. 7 is an enlarged view showing part of FIG. 6.

The second embodiment is different from the first embodiment in that a bending tool 22 and a drawing tool 23 are provided in addition to the cutting tools in a metal mold assembly.

The operation of this embodiment will be described hereunder. Similarly to the first embodiment, two plates put one on the other are fed in the metal mold assembly, and are simultaneously subjected to press working by means of sets of piercing punches and dies provided in the metal mold assembly. Thus, by the press working, holes are simultaneously formed in the plates. Succeedingly, the movable metal mold 9 is moved upward by a predetermined distance while the upper metal plate 8b is attracted to the bottom surface of the movable metal mold 9 by means of vacuum or magnetic attraction. Accordingly, a cavity having a predetermined width is formed between the two metal plates. The synthetic resin 7 is poured into the cavity by means of injection molding, so that the five-layer structure and the shapes outside the plates are simultaneously formed. At that time, as shown in FIG. 7, resin pressure 24 due to the injection molding is applied to the drawing portion, so that drawing is performed on the plate member. The drawing portion is strongly pressed by the synthetic resin 7 against the drawing tool 23, so that a molded member can be worked with following the die with high accuracy and no return after working such as spring back or the like. The bending work portion is strongly pressed by the synthetic resin 7 against the bending tool 22 which is pushed by a spring, so that the bending is performed.

When the synthetic resin 7 has been hardened, the movable metal mold 9 is further moved upward and the molded member is taken out.

According to the second embodiment, it is possible to easily produce an integral composite formed member having a shape which is obtained by means of ordinary injection molding, having high hardness, and being light. Further, bending working and drawing-working can be performed simultaneously with injection molding, so that the number of producing steps can be reduced. As described above, opposed liquid-pressure drawing-working can be performed on the metal plates by the pressure in injection molding, so that there is an advantage that only a metal mold is required on the die side in drawing-working while no metal mold is required on the punch side.

Figure 8A:
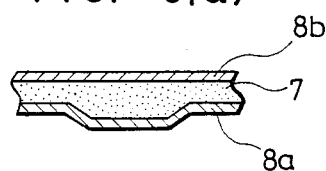
FIGS. 8(a) and 8(b) are sectional views showing modifications of the drawing-working portion.
Figure 8B:
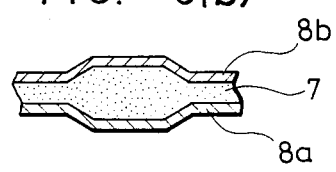

FIGS. 8(a) and 8(b) show modifications of drawing-working. According to the embodiment, the opposed liquid-pressure drawing-working can be performed as described above, so that shallow drawing can be performed not only on one of the two metal plates as shown in FIG. 8(a) but on both the upper and lower metal plates as shown in FIG. 8(b). Accordingly, a composite member having a projecting portion can be easily formed. If the drawing is performed on a composite member at its portion to which some force is exerted, the composite member can be improved in partial strength.

Moreover, it is apparent that bending working can be added in the press working in the foregoing embodiments.

As is apparent by the above description, according to the present invention, the following effects can be achieved.

(1) The metal plates can be easily and firmly fastened to each other.

(2) The composite member having the structure constituted by the five layers of the metal plate, the adhesive layer, the synthetic resin layer, the adhesive layer, and the metal plate, and further having a synthetic resin molded portion such as a flange, a stud, a bracket, or the like on the outside of the metal plates can be integrally formed by one stroke. That is, the conventional steps in which the plate of synthetic resin is formed by means of extrusion and then the metal plates are bonded to the resin plate become unnecessary, and also it is not necessary to attach a separately formed member onto the metal plates by means of screws, or the like. Thus, the production process is made simple.

(3) The composite member obtained according to the present invention has hardness higher than that of a conventional member of synthetic resin having the same thickness as that of the former, and is lighter in weight than a metal plate having the same thickness as that of the former.

(4) The metal plates are uniformly pressed against the metal mold under the pressure in injection molding, so that the produced composite member is accurate in formation.

(5) The composite member made of the metal plates and the synthetic resin can be produced without heating the metal mold assembly.

What is claimed is:

1. A method of manufacturing a composite member composed of metal plates and synthetic resin, comprising the steps of:
    (a) mounting a stack of two metal plates between first and second metal molds, each of said two metal plates having an adhesive layer and said two metal plates being put with their respective adhesive layers inside, said first metal mold having at least one of a fixed piercing punch and a movable piercing punch, and said second metal mold having at least one of a fixed piercing die and a movable piercing die;
    (b) performing pressing work on said metal plates;
    (c) separating said first and second metal molds by a predetermined distance by moving at least one of said first and second metal molds from the other while holding said metal plates facing each other to thereby form a cavity of a predetermined distance between said two metal plates
    (d) injection-pouring melted synthetic resin into said cavity between said metal plates to form a resin layer therein; and
    (e) removing a molded product after said resin layer has been hardened.

2. The method of manufacturing a composite member composed of metal plates and synthetic resin according to claim 1, further comprising the steps of:
    (a) moving said movable piercing punch and movable piercing die inward, thereby creating metal plates having holes therethrough; and then
    (b) retracting said movable piercing punch and movable piecing die into said metal molds before pouring said synthetic resin, thereby forming spaces outside said respective metal plates connected to said cavity through said holes,
    said synthetic resin being allowed to flow into said spaces.

3. The method of manufacturing a composite member composed of metal plates and synthetic resin according to claim 1, further comprising the step of providing tools for bending at least one of said metal plates in said first and second metal molds.

4. The method of manufacturing a composite member composed of metal plates and synthetic resin according to claim 2, further comprising the step of providing tools for bending at least one of said metal plates in said first and second metal molds.

5. The method of manufacturing a composite member composed of metal plates and synthetic resin according to claim 1, further comprising the step of providing a tool for drawing at least one of said metal plates in at least one of said first and second molds to carry out drawing work by resin pressure injection pouring.

6. The method of manufacturing a composite member composed of metal plates and synthetic resin according to claim 2, further comprising the step of providing a tool for drawing at least one of said metal plates in at least one of said first and second molds to carry out drawing work by resin pressure injection pouring.

* * * * *